Dec. 15, 1964  E. T. GETZ  3,161,071
TORQUE TRANSMITTING DEVICE
Filed Jan. 10, 1963
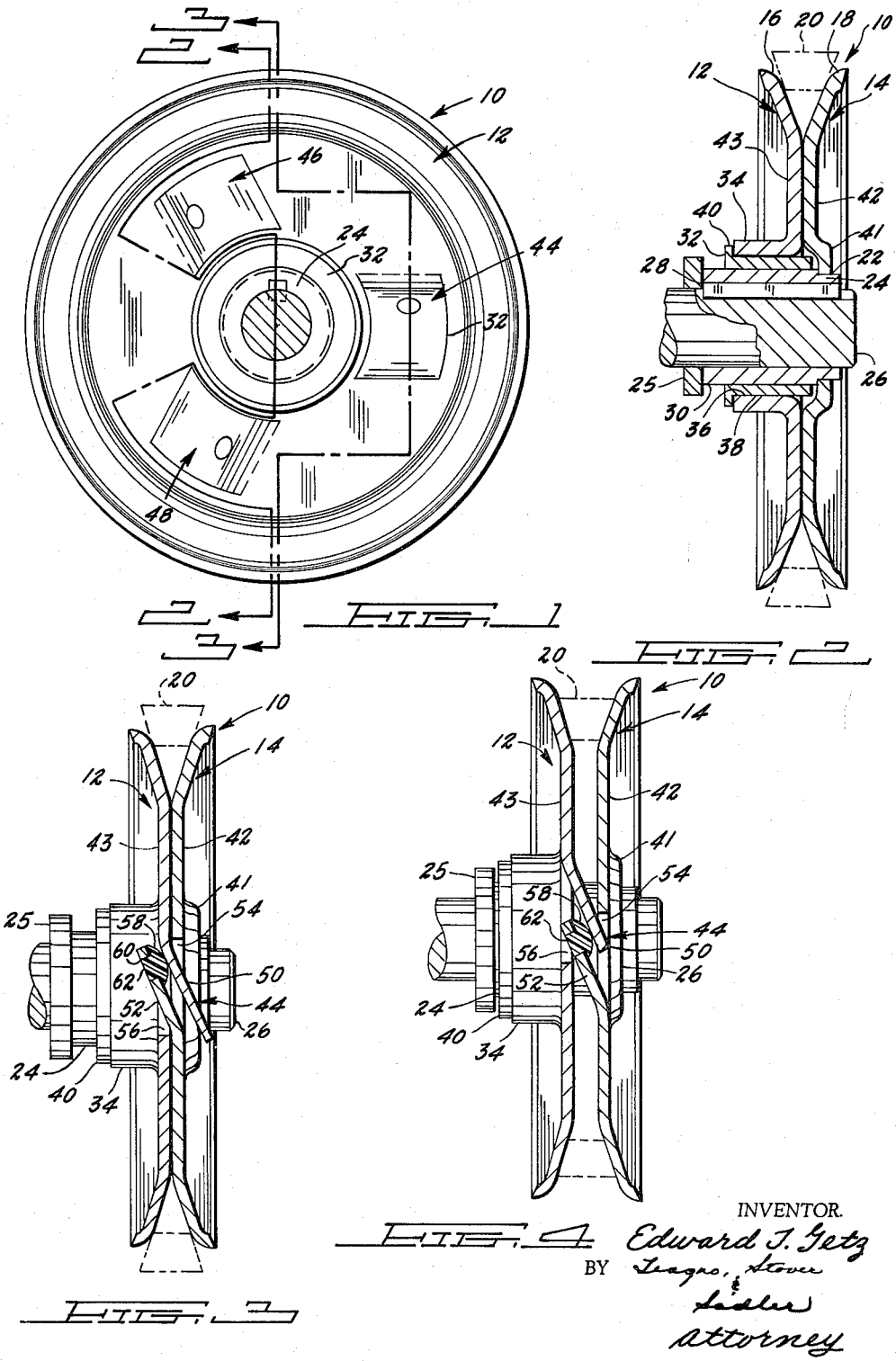
INVENTOR.
Edward T. Getz
BY Teagno, Stover
& Laidler
attorney ns Patent Office
3,161,071
Patented Dec. 15, 1964

3,161,071
TORQUE TRANSMITTING DEVICE
Edward T. Getz, Cleveland Heights, Ohio, assignor to Eaton Manufacturing Company, Cleveland, Ohio, a corporation of Ohio
Filed Jan. 10, 1963, Ser. No. 250,672
9 Claims. (Cl. 74—230.24)

This invention broadly relates to torque transmitting devices of the pulley type. More specifically, this invention pertains to a self-compensating pulley operable to adjust upon the occurrence of slippage between a driving means, in the form of an endless belt, and the sheave halves of a pulley due to lengthening of the driving means or increased loads being imposed on the pulley during operation to maintain a desired belt tension.

To date, there have been numerous self-compensating pulleys developed utilizing the basic principle of operation of providing a control or compensating means associated with the pulley which upon response to slip or drag occurring between the driving means and the sheave halves of the pulley during momentary increased loads on the pulley, will operate to reduce the axial distance between the sheave halves effective to increase the working or pitch diameter of the pulley and accordingly, relieve the slack in the driving means. The application of self-compensating pulleys is particularly desirable in situations wherein it is necessary to take up slack in a belt type drive means resulting from lengthening of the belt. In the use of a flexible belt type driving means, application of continuous and variable loads will tend to stretch or permanently deform the flexible belt, resulting in an increase in the overall length of the belt and reduction in the tension thereof and accordingly, allow slippage between the belt and the sheave halves and reduction in load carrying capabilities of the pulley. The novel pulley structure of this invention in the utilization of the basic principle of self-compensation overcomes the problem of maintenance of belt tension by incorporating means which performs this function in a simple and unique manner.

It is therefore a principal object of this invention to provide a novel torque transmitting pulley capable of automatically compensating for lengthening of a belt type drive means through the use of cooperably engageable members axially disposed between the sheave halves.

It is another object of this invention to provide a novel self-compensating torque transmitting pulley wherein means compensating for belt lengthening is radially outwardly disposed of the hub portion of the pulley and axially disposed intermediate of the sheave halves.

It is still another object of this invention to provide a novel self-compensating torque transmitting pulley device wherein one sheave half is secured to the hub portion of the pulley and the other sheave half is rotatably journaled on the hub portion of the pulley.

It is also an object of this invention to provide a novel self-compensating torque transmitting pulley device wherein the compensating means is formed integral with the sheave halves.

It is a further object of this invention to provide a novel self-compensating torque transmitting pulley wherein the compensating means comprises interengageable structure unitary with the sheave halves radially outwardly disposed from the hub portion of the pulley.

It is a further object of this invention to provide a novel self-compensating torque transmitting pulley which has few working parts, is durable in operation and inexpensive to produce.

These and other objects of this invention will become apparent from a reading of the following description taken in conjunction with the drawing in which:

FIGURE 1 is a plan view of the novel pulley of this invention.

FIGURE 2 is a cross-sectional view, taken substantially along the line 2—2 of FIGURE 1, showing the relationship of the sheave halves to the mounting on the pulley hub member.

FIGURE 3 is a cross-sectional view taken substantially along the line 3—3 of FIGURE 1, showing the relationship of the compensating means to the sheave halves in one position of compensation of the pulley, with some of the tab and slot compensating means being removed for purposes of clarity.

FIGURE 4 is a cross-sectional view similar to FIGURE 3, disclosing the relationship of the compensating means to the sheave halves in another position of compensation of the pulley.

Reference being made to FIGURES 1 and 2 of the drawing, the novel pulley 10 comprises a pair of sheave halves 12 and 14 axially disposed with respect to one another. The sheave halves 12 and 14 respectively, are formed so that upon assembly their outer peripheral portions 16 and 18 define a V-shaped groove for receipt of a driving means such as a belt shown in dotted lines at 20. The particular configuration of the V-shaped groove, as shown in FIGURE 2, can be made by either casting or preferably stamping the pulley material into the particular shape desired for use with a driving or driven belt means.

At the radially innermost central portion of sheave half 14 is a substantially cylindrical opening 22 adapted to receive a pulley hub member 24 therein. Member 24 is permanently secured to sheave half 14 by press-fitting, staking, keying or like securing operation. The hub member 24 is adapted to be secured in driving relation to a shaft 26 by press-fitting or preferably keying as shown at 28 in FIGURE 2. The hub member 24 has a smooth outer bearing surface 30 upon which a bushing 32 is rotatably journaled. The sheave half 12 is formed with an inner peripheral axially extending portion 34, concentric to the axis of rotation of the pulley 10. The surface 36 of the portion 34 forms an opening in sheave half 12 which circumscribes the outer periphery 38 of bushing 32 and is rigidly secured thereto by press-fitting, staking or like securing operation. An annular lip portion 40 on bushing 32 cooperates with portion 34 (see FIGURE 2) to aid in retaining sheave half 12 on the bushing 32 against any force of the belt 20 tending to axially move the sheave half relative to the bushing. An annular portion 41 of sheave half 14 adjacent the opening 22 therein is disposed out of the plane of the face portion 42 thereof allowing bushing 32 to be of sufficient length (see FIGURE 2) to obtain a good bearing relationship between the bushing and the pulley hub member 24. A collar 25 is fixed to shaft 26 adjacent the end portion of hub member 24 to limit the extent of axial movement of sheave half 12 with respect to sheave half 14. It thus becomes readily apparent, that the relationship of bushing 32 and hub member 24 axially locates the sheave halves with respect to each other and allows relative rotation of the sheave halves with respect to one another.

Attention is now directed to FIGURES 1, 3 and 4 wherein the novel compensating means is disclosed that functions to maintain proper belt tension. The compensating means takes the form of a plurality of interrelated tab and slot means shown at 44, 46 and 48. Since these interrelated tab and slot means are of substantially the same configuration, only the tab and slot arrangement shown at 44 will be described in detail. As shown in FIGURES 3 and 4, the sheave halves 12 and 14 respectively, contain tab elements 50 and 52 angularly disposed out of the plane of the face portions 43 and 42 respectively, of sheave halves 12 and 14. Tab elements 50 and 52 are integral with the respective sheave halves and are of substantially the same dimensions throughout. In the formation of these tab elements, the tabs are stamped out of the face of the respective sheave halves to expose an opening in each sheave half which is of substantially the same length and width as the tab elements. The tab element 50 on sheave half 12 is adapted to be received in the opening 54 in sheave half 14 and in like manner the tab element 52 on sheave half 14 is adapted to be disposed in the opening 56 in sheave half 12. Adjacent the end portion of a tab element 52 is a button 58 engageable with tab element 50 to function as bearing member between the tab elements. This button to tab element contact eliminates the necessity of the two mating tabs of the sheave halves to be coincident or stamped to the same arcuate form. The button 58 is formed of a low coefficient of friction resilient material such as a plastic, and is secured to tab element 52 by any suitable means such as press-fitting shank portion 62 thereof into opening 60 in the tab element. This type of button material performs a sound damping function between the mating tab elements of the sheave halves. It is also apparent that the button 58 could be secured to tab element 52 by any other suitable means such as by an adhesive or permanent molding.

In the embodiment disclosed in FIGURE 1, only three tab and slot compensating means are shown, however, any number of such compensating means could be utilized depending upon the size of the pulley that is to be used to perform the self-compensating function.

In operation of this novel pulley mechanism, slippage of belt 20 across the surface of the V-shaped groove formed by the sheave halves resulting from either belt wear or increased loads thereon, will tend to rotate the sheave half 12 with respect to the sheave half 14. Since sheave half 14 is secured on shaft 26 constituting the output element of the pulley adapted to have a load thereon, slippage of the belt in the V-shaped groove when driving the pulley in a counterclockwise direction as shown in FIGURE 4, will result in slippage between sheave half 14 and belt 20. Since sheave half 12 is rotatably journaled on shaft 26 through bushing 32, sheave half 12 carries no load thereon. Therefore, as belt 20 slips on sheave half 14, sheave half 12 will continue to be driven resulting in the button 58 riding up the ramp formed by tab element 50 causing the sheave half 12 to rotate and axially relocate with respect to sheave half 14 to a position as shown in FIGURE 3.

With the intercooperating tab and slot means on the respective sheave halves, rotational movement of one sheave half with respect to the other will result through a ramp action in axial relocation of sheave half 12 with respect to sheave half 14 reducing the space between the sheave halves to thereby increase the effective diameter of the pulley and reduce or substantially eliminate any slack existing in the belt. Should the tension of belt 20 become too high due to, for example, the load on the pulley being released that caused the effective diameter thereof to increase, in the manner set forth above, such tension will cause sheave half 12 to slip on the belt and rotate and axially relocate relative to sheave half 14 in a direction to decrease the effective pulley diameter to that necessary to maintain desired belt tension. During this latter condition, the collar 25 functions as a stop acting against lip portion 40 of bushing 32 to prevent axial movement of sheave half 12 beyond the point at which the button 58 engages the tab element 50.

In pulley devices operating on the self-compensating principle set forth above, the angle at which the tab elements are disposed out of the face of the respective sheave half is important since an angle of inclination requiring torque load greater than that supplied by the belt to move the button on the ramp formed by tab 50 will result in both sheave halves slipping on the belt during a belt slackened condition. To determine the angle at which the tab elements should be disposed out of the face of the respective sheave half, consideration must be taken of the torque to be applied to the pulley and the diameter of the pulley that is required for the particular drive application. Considering the distance from the point of contact of the button 58 on tab element 50 to the center of the axis of rotation of shaft 26 as the lever arm, this length of lever arm times the force required to move the button up the ramp provided by tab element 50 should equal the torque applied to the pulley during normal drive conditions. In the use of larger diameter pulleys for certain drive systems transmitting the same torque, the distance from the button 58 to the center of shaft 26 will usually increase requiring the angle of inclination of each tab element to be decreased so that less force will be required to make the button move up the ramp, thus enabling the torque transmitted by the belt to rotate sheave half 12 with respect to sheave half 14 to maintain desired belt tension. It therefore, becomes apparent that as the diameter of the pulley to be used in certain drive environments increases, the inclination of the tab elements with respect to the face of the sheave half will decrease for the pulley to be responsive to a pre-established torque. In this manner, it can be determined what particular inclination must be given to the tab elements so that the pulley sheave halves will rotate with respect to each other and thus axially relocate upon a slackening of the belt due to either belt wear or increased torque load applied to effectively increase the pitch diameter of the pulley to maintain desired belt tension.

While this invention has been described in connection with certain specific embodiments, it is apparent to one skilled in the art that the principle involved in the novel concept is capable of numerous other applications and therefore the invention is limited only as indicated by the scope of the appended claims.

I claim:

1. A pulley mechanism for automatically maintaining a constant tension on a cooperating drive means, comprising:
   a hub member;
   a first sheave half secured to said hub member;
   a second sheave half axially positioned relative to said first sheave half and rotatably journaled on said hub member, said sheave halves defining the effective diameter of said pulley mechanism;
   a plurality of interfitting means circumferentially spaced on each of said sheave halves providing cooperating inclined surfaces effective to control relative rotation of one of said sheave halves with respect to the other of said sheave halves in response to variations in loads imposed on said pulley mechanism to vary the effective diameter of said pulley mechanism and maintain said tension on said driving means.

2. A pulley mechanism for automatically maintaining a constant tension on a driving means cooperable therewith, comprising:
   a hub member;
   a pair of axially positioned sheave halves defining the effective diameter of said pulley mechanism, one of said sheave halves being rotatably journaled on said hub member, and the other of said sheave halves being secured to said hub member;
   a plurality of interfitting means circumferentially spaced on each of said sheave halves providing cooperating inclined surfaces effective upon induced relative rotation of one of said sheave halves to vary the axial position thereof with respect to the other of said sheave halves to vary the effective diameter of said pulley mechanism to maintain said tension on said driving means.

3. A pulley mechanism for automatically maintaining a constant tension on a driving means cooperable therewith according to claim 2, wherein said plurality of means are radially outwardly spaced from said hub member substantially axially intermediate said sheave halves.

4. A pulley mechanism for maintaining a constant tension on a cooperating driving means, comprising:
a hub member;
a first sheave half fixed to said hub member;
a second sheave half axially positioned relative to said first sheave half and rotatably journaled on said hub member, each of said sheave halves including a face portion disposed in a plane substantially normal to the axis of said pulley mechanism;
a plurality of tab elements on each of said sheave halves, each of said tab elements being angularly disposed with respect to said plane of the face portion of each of said sheave halves, and means including said tab elements to control relative rotation of said second sheave half in response to variable loads on said pulley to maintain said tension on said driving means.

5. A pulley mechanism for automatically maintaining a constant tension on a driving means cooperable therewith, comprising:
a hub member;
a first sheave half secured to said hub member;
a second sheave half axially positioned relative to said first sheave half and rotatably journaled on said hub member, said sheave halves defining the effective diameter of said pulley and adapted to receive said driving means therebetween;
a first tab means on said first sheave half providing a surface inclined with respect to said first sheave half;
a second tab means on said second sheave half providing a surface inclined with respect to said second sheave half and cooperable with said inclined surface on said first tab means to vary the effective diameter of said pulley in response to load fluctuations thereon to maintain said tension on said driving means.

6. A pulley mechanism for maintaining a constant tension on a driving means cooperable therewith according to claim 5, wherein said first sheave half has an opening adjacent said first tab means for receipt of said second tab means and said second sheave half has an opening adjacent said second tab means for receipt of said first tab means.

7. A pulley mechanism for maintaining a constant tension on a driving means cooperable therewith according to claim 6, wherein said first tab means includes a button member engageable with said second tab means.

8. A pulley mechanism for automatically maintaining a constant tension on a driving means cooperable therewith, comprising:
a pair of cooperable sheave halves, one of said sheave halves being rotatably and axially moveable relative to the other of said sheave halves;
a plurality of interengaging means on each of said sheave halves, disposed axially and radially within the axial and radial extremities of said sheave halves effective to control rotatable and axial movement between said sheave halves;
said interengaging means comprising angularly disposed frictionally cooperable surfaces.

9. A pulley mechanism for automatically maintaining a constant tension on a driving means cooperable therewith according to claim 8, wherein said frictionally cooperable surfaces are disposed at an angle to a plane normal to the axis of said pulley mechanism, and wherein the cooperation between said surfaces in effecting said movement between said sheave halves occurs in an axial zone which traverses a plane medially of the sheave halves.

References Cited in the file of this patent

UNITED STATES PATENTS

| | | |
|---|---|---|
| 2,120,383 | Watson | June 14, 1938 |
| 2,741,135 | Numan | Apr. 10, 1956 |
| 2,938,395 | Hovorka | May 31, 1960 |